United States Patent
Liu et al.

(10) Patent No.: US 10,894,323 B2
(45) Date of Patent: Jan. 19, 2021

(54) PIPELINE ROBOT, PIPELINE VIDEO-SIGNAL ACQUISITION AND TRANSMISSION DEVICE AND PIPELINE DETECTION SYSTEM AND METHOD

(71) Applicant: WUHAN EASY-SIGHT TECHNOLOGY CO., LTD., Hubei (CN)

(72) Inventors: Zhiguo Liu, Hubei (CN); Yanlei Lu, Hubei (CN); Fang Yu, Hubei (CN); Jincheng Jiang, Hubei (CN); Xiang Wang, Hubei (CN); Jia Yu, Hubei (CN); Geng Peng, Hubei (CN); Lisha Wang, Hubei (CN); Jiansheng Liu, Hubei (CN); Lu Chen, Hubei (CN); Wanjia Zhang, Hubei (CN); Hao Li, Hubei (CN)

(73) Assignee: WUHAN EASY-SIGHT TECHNOLOGY CO., LTD., Hubei (CN)

( * ) Notice: Subject to any disclaimer, the term of this patent is extended or adjusted under 35 U.S.C. 154(b) by 228 days.

(21) Appl. No.: 15/776,069

(22) PCT Filed: Jun. 30, 2016

(86) PCT No.: PCT/CN2016/087837
§ 371 (c)(1),
(2) Date: May 14, 2018

(87) PCT Pub. No.: WO2017/215041
PCT Pub. Date: Dec. 21, 2017

(65) Prior Publication Data
US 2020/0094413 A1    Mar. 26, 2020

(30) Foreign Application Priority Data

Jun. 17, 2016 (CN) .......................... 2016 1 0432057
Jun. 17, 2016 (CN) .......................... 2016 2 0597737

(51) Int. Cl.
*B25J 9/16* (2006.01)
*B25J 5/00* (2006.01)
(Continued)

(52) U.S. Cl.
CPC ............. *B25J 9/1697* (2013.01); *B25J 5/007* (2013.01); *B25J 19/023* (2013.01); *H04N 5/2256* (2013.01); *H04N 7/181* (2013.01)

(58) Field of Classification Search
CPC ........ B25J 9/1697; B25J 19/023; B25J 5/007; H04N 5/2256; H04N 7/181
See application file for complete search history.

(56) References Cited

U.S. PATENT DOCUMENTS 9,784,599 B1 * 10/2017 Close ..................... G01D 11/00
2002/0190682 A1 * 12/2002 Schempf ............... G01M 3/005
318/568.11

FOREIGN PATENT DOCUMENTS

| CN | 203259143 | 10/2013 |
| CN | 203309524 | 11/2013 |

(Continued)

OTHER PUBLICATIONS

"International Search Report (Form PCT/ISA/210)", dated Mar. 29, 2017, with English translation thereof, pp. 1-4.
(Continued)

*Primary Examiner* — Rodney A Butler
(74) *Attorney, Agent, or Firm* — JCIPRNET

(57) ABSTRACT

A pipeline robot, a pipeline video signal acquisition and transmission device, and a pipeline detection system and method. The pipeline robot comprises a camera module and a crawler, wherein the camera module comprises a front-view digital camera, a first microprocessor and a rotation motor; the crawler comprises a frame body, wheels on the both sides of the frame body, a driving motor, a sensor
(Continued)

group, a second microprocessor, a network transmission module and a first power carrier module; a cable reel comprises a power line, a second power carrier module, a fourth microprocessor and a network communication module; and an acquisition control terminal is a mobile terminal provided with a detection module.

20 Claims, 5 Drawing Sheets

(51) Int. Cl.
  *H04N 7/18* (2006.01)
  *B25J 19/02* (2006.01)
  *H04N 5/225* (2006.01)

(56) References Cited

FOREIGN PATENT DOCUMENTS

| | | |
|---|---|---|
| CN | 203770944 | 8/2014 |
| CN | 104192216 | 12/2014 |
| CN | 104653945 | 5/2015 |
| CN | 105318140 | 2/2016 |
| CN | 205278673 | 6/2016 |
| JP | 2003014652 | 1/2003 |

OTHER PUBLICATIONS

"Office Action of China Counterpart Application," dated Jun. 1, 2018, pp. 1-9.

\* cited by examiner

PIPELINE ROBOT, PIPELINE VIDEO-SIGNAL ACQUISITION AND TRANSMISSION DEVICE AND PIPELINE DETECTION SYSTEM AND METHOD

CROSS-REFERENCE TO RELATED APPLICATION

This application is a 371 application of the international PCT application serial no. PCT/CN2016/087837, filed on Jun. 30, 2016, which claims the priority benefit of China application no. 201610432057.8 and no. 201620597737.0, both filed on Jun. 17, 2016. The entirety of each of the abovementioned patent applications is hereby incorporated by reference herein and made a part of this specification.

BACKGROUND

Technical Field

The invention belongs to the field of detection of pipelines such as sewage pipelines, rainwater pipelines, petroleum pipelines and fuel gas pipelines, and specifically relates to a pipeline robot, a pipeline video signal acquisition and transmission device, and a pipeline detection system and method.

Description of Related Art

In order to dredge and repair municipal drainage underground drainage pipelines, agricultural water underground drainage pipelines, industrial water underground drainage pipelines, tap water underground drainage pipelines and other underground pipelines, the internal conditions of the drainage pipelines, such as pipeline dislocation, buried wellheads and leakage of the drainage pipelines need to be understood.

At present, a pipeline robot detection system in the field of underground pipeline detection is relatively heavy in equipment and complex in structural composition, and comprises a crawler, a lens, a cable reel, a 5-meter connection cable and an acquisition control host. The lens adopts a low-resolution analog camera, images acquired by the acquisition control host are analog images with poor quality, and thus the fine interpretation and detection of the pipelines and the digitalized transmission cannot be realized. The communication control mode adopts a traditional 485 or CAN bus communication mode, and the cable includes power lines, video transmission lines and communication lines, has more core lines, and is thicker and heavier. The system needs to be assembled on site, the acquisition control host needs to be connected by using a 5-meter connection cable, the cable reel also needs to be connected by using a 5-meter cable, the line outlet end of the cable reel is connected with the crawler, and the lens is arranged on the crawler. The complete set of equipment is complicated in site assembly, the cable line is thick and heavy, an acquisition control system is relatively heavy and inconvenient to move, and the site working efficiency is relatively low.

SUMMARY OF THE INVENTION

The technical problem to be solved by the invention is to provide a pipeline robot, a pipeline video signal acquisition and transmission device and a pipeline detection system and method, which can decrease the number of cable lines and increase the transmission distance.

In order to solve the above technical problems, the invention adopts the technical scheme as follows:

A pipeline robot, comprising a camera module and a crawler, characterized in that:

the camera module comprises a front-view digital camera, a first microprocessor, a rotation motor and a first interface, wherein the front-view digital camera and the first microprocessor are each connected with the first interface, and the output end of the first microprocessor is connected with the rotation motor;

the crawler comprises a frame body, wheels on the both sides of the frame body, a driving motor for driving the wheels, a sensor group for acquiring state parameters, a second microprocessor, a network transmission module, a first power carrier module, a second interface matched with the first interface, and a power line interface connected with the first power carrier module, wherein the output end of the sensor group is connected with the second microprocessor, the output end of the second microprocessor is connected with the driving motor, and the second microprocessor is connected with the network transmission module; and the network transmission module is connected with the first power carrier module, and the power line interface inputs and outputs data through a power line; and the first microprocessor is connected with the second microprocessor through the first interface and the second interface, and the front-view digital camera is connected with the network transmission module through the first interface and the second interface.

According to the above scheme, the pipeline robot also comprises a lifting device, wherein the lifting device comprises a lifting frame body and a hardware module; the lifting frame body is formed by sequentially connecting a lifting frame, a lifting arm and a lifting seat, and the lifting seat is mechanically connected with the frame body of the crawler; the hardware module comprises a third microprocessor and a lifting motor which are connected to each other, the lifting motor being used for driving the lifting aim; the lifting frame is provided with a third interface that is matched with the first interface, the lifting seat is provided with a fourth interface that is matched with the second interface, and the third microprocessor is connected between the first microprocessor and the second microprocessor through the first interface, the third interface, the fourth interface and the second interface.

According to the above scheme, the camera module also comprises an air pressure sensor connected to the first microprocessor.

According to the above scheme, the rotation motor comprises a horizontal rotation motor and a vertical rotation motor.

According to the above scheme, the lifting arm is provided with a lifting limit position, and the lifting limit position is provided with a limit potentiometer connected to the third microprocessor.

According to the above scheme, the crawler is provided with a rear-view digital camera that is connected with the network transmission module through the fourth interface and the second interface.

According to the above scheme, the camera module is provided with a light source that is connected with the second microprocessor through the first interface and the second interface.

A pipeline video signal acquisition and transmission device, comprising the pipeline robot, and also comprising a cable reel, wherein the cable reel comprises the power line connected with the power line interface, a second power carrier module for parsing power carrier signals into digital signals, a fourth microprocessor and a network communication module for performing data transmission with a monitoring system, and the second power carrier module, the fourth microprocessor and the network communication module are sequentially connected.

According to the above device, the network communication module is a wireless communication module.

A pipeline detection system, comprising a pipeline robot, a cable reel and an acquisition control terminal, characterized in that the pipeline robot comprises a camera module and a crawler;

the camera module comprises a front-view digital camera, a first microprocessor, a rotation motor and a first interface, wherein the front-view digital camera and the first microprocessor are each connected with the first interface, and the output end of the first microprocessor is connected with the rotation motor;

the crawler comprises a frame body, wheels on the both sides of the frame body, a driving motor for driving the wheels, a sensor group for acquiring state parameters, a second microprocessor, a network transmission module, a first power carrier module, a second interface matched with the first interface, and a power line interface connected with the first power carrier module, wherein the output end of the sensor group is connected with the second microprocessor, the output end of the second microprocessor is connected with the driving motor, and the second microprocessor is connected with the network transmission module; and the network transmission module is connected with the first power carrier module, and the power line interface inputs and outputs data through a power line;

the first microprocessor is connected with the second microprocessor through the first interface and the second interface, and the front-view digital camera is connected with the network transmission module through the first interface and the second interface;

the cable reel comprises the power line connected with the power line interface, a second power carrier module for parsing power carrier signals into digital signals, a fourth microprocessor and a network communication module for performing data transmission with a detection module, wherein the second power carrier module, the fourth microprocessor and the network communication module are sequentially connected; and the acquisition control terminal is a mobile terminal provided with a detection module, which is used to receive digitalized video and state parameter signals from the network communication module, and the detection module receives control instructions, detection instructions and input parameters through a human-computer interaction mode, sends the control instructions from the network communication module to the cable reel, performs corresponding operations according to the detection instructions, and carries out data storage.

According to the above system, the pipeline robot also comprises a lifting device, wherein the lifting device comprises a lifting frame body and a hardware module; the lifting frame body is formed by sequentially connecting a lifting frame, a lifting arm and a lifting seat, and the lifting seat is mechanically connected with the frame body of the crawler; the hardware module comprises a third microprocessor and a lifting motor which are connected to each other, the lifting motor being used for driving the lifting arm; the lifting frame is provided with a third interface that is matched with the first interface, the lifting seat is provided with a fourth interface that is matched with the second interface, and the third microprocessor is connected between the first microprocessor and the second microprocessor through the first interface, the third interface, the fourth interface and the second interface.

According to the above system, the camera module also comprises an air pressure sensor connected to the first microprocessor.

According to the above system, the rotation motor comprises a horizontal rotation motor and a vertical rotation motor.

According to the above system, the lifting arm is provided with a lifting limit position, and the lifting limit position is provided with a limit potentiometer connected to the third microprocessor.

According to the above system, the lifting frame is provided with a rear-view digital camera that is connected with the network transmission module through the fourth interface and the second interface.

According to the above system, the camera module is provided with a light source that is connected with the second microprocessor through the first interface and the second interface.

A detection method implemented by using the above pipeline detection system, characterized by comprising the following steps:

S1, the mobile terminal with the detection module carries out a network connection with the cable reel;

S2, video data acquired by the digital camera in the pipeline robot and data acquired by the sensor group are combined into one path of digital signals through the network transmission module, and the digital signals are transmitted to the second power carrier module on the cable reel through the power line by the first power carrier module in the form of power carrier; the second power carrier module on the cable reel parses out the digital signals and sends the digital signals to the mobile terminal that is provided with the detection module through the network communication module; and the detection module superposes the data acquired by the sensor group to the video data acquired by the digital camera for display; and S3, the detection module receives the control instructions, the detection instructions and the input parameters through a human-computer interaction mode;

the control instructions are sent to the cable reel through the network communication module, and then are transmitted to the pipeline robot through the power line by the second power carrier module in the form of power carrier to call each corresponding microprocessor to perform instruction operations;

the detection module further comprises a calculation module for performing calculation by using the input parameters according to a pipeline detection standard and generating a detection report; and the detection module performs corresponding operations according to the detection instructions and carries out data storage.

According to the method, the control instructions include a rotation motor control instruction, a driving motor control instruction, a digital camera control instruction and a light source switch instruction.

According to the method, the detection instructions include a picture storage instruction, a video storage instruction, a detection report generation instruction and a detection report storage instruction.

The scheme of the invention has the following beneficial effects:

1. The scheme of the invention adopts digital cameras, and the camera module and the crawler are in detachable connection, have a simple connection mode, and are convenient to carry and convenient for site assembly; the power carrier modules are adopted, the synchronous and common-line transmission Of power supplies, video signals and control signals can be achieved by merely using a dual-core line, the number of the cable can be decreased, the weight can be reduced, and the operation efficiency can be improved; meanwhile, based on the characteristics of the field, the impact on power carriers in the pipeline is small, the ultra-long distance transmission (more than 3 km) can be achieved through the transmission mode, and the working efficiency can be greatly improved compared with a traditional bus communication mode; and on the basis of pure digitalized data transmission, a pure software mode is adopted, and remote operations can be achieved only by installing detection module software at the mobile terminal without using a traditional large control box.

2. The lifting device is additionally arranged between the camera module and the crawler that are detachably connected, a mechanical connection mode and an electrical connection mode there-between are both simple and feasible, convenient assembly can be achieved, and the requirements of different pipelines for video acquisition heights can be adapted.

3. The cable reel parses received power carrier signals into the digital signals and then sends the digital signals to the mobile terminal through a wireless transmission mode, the control instructions are wirelessly received from the mobile terminal and then are sent to the pipeline robot through the power carrier modules to achieve the wireless transmission of the signals, and the remote operations can be further facilitated.

4. The rear-view digital camera is additionally arranged on the lifting device, and two paths of video signals are both connected with the network transmission module to achieve the synchronous transmission and display of multiple paths of video signals.

In the figures: 1—camera module, 2—lifting device, 3—crawler, 11—first interface, 21—lifting frame, 22—lifting arm, 23—lifting seat, 24—third interface, 25—fourth interface, 31—frame body, 32—wheels, 33—second interface, 34—power line interface.

DETAILED DESCRIPTION OF THE EMBODIMENTS

The invention is further described with specific examples below.

Figure 2:
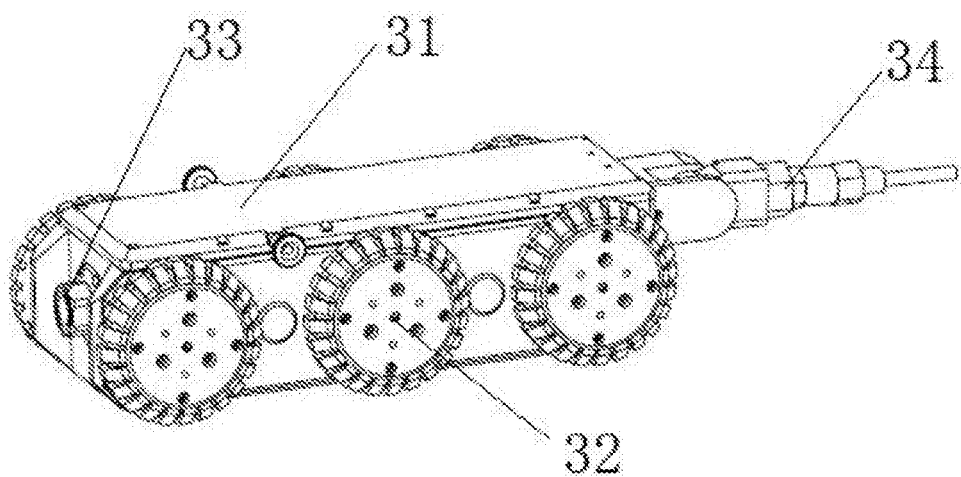
FIG. 2 is a structural schematic diagram of a crawler.
Figure 4:
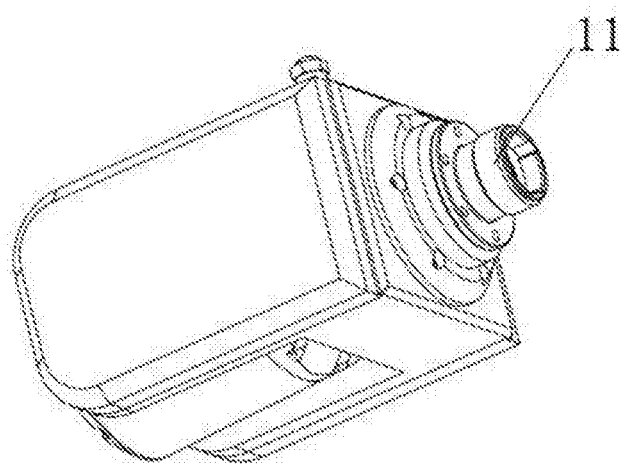
FIG. 4 is a structural schematic diagram of a camera module.
Figure 5:
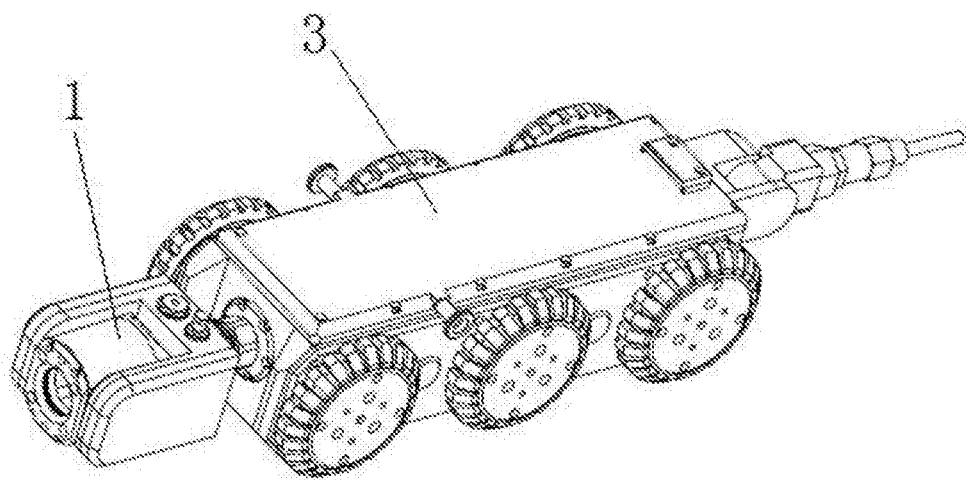
FIG. 5 is a use state diagram of an embodiment of the invention.
Figure 6:
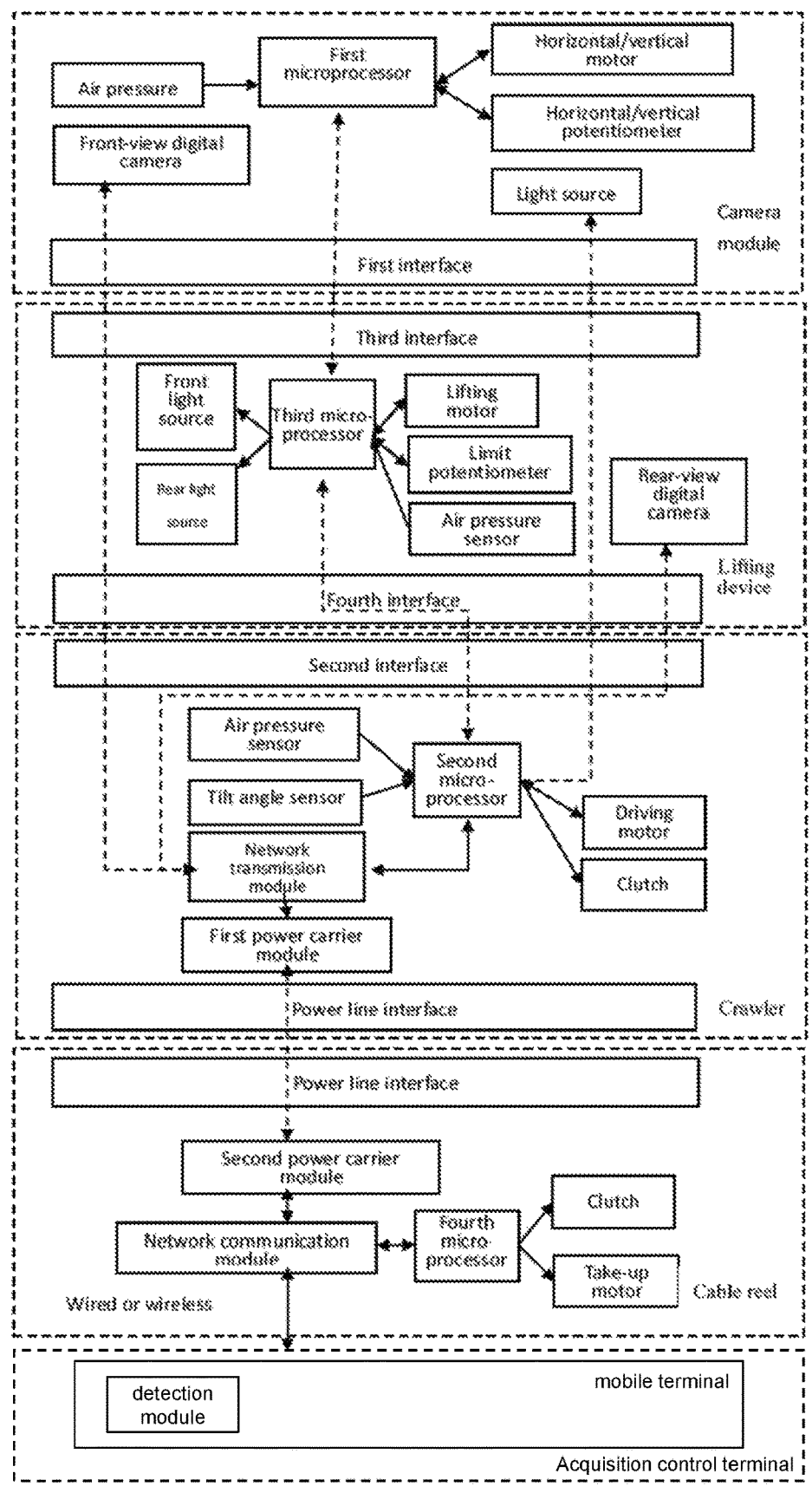
FIG. 6 is a hardware functional block diagram of an embodiment of the invention.

A pipeline robot, as shown in FIG. 5 and FIG. 6, comprising a camera module 1 and a crawler 3, wherein the camera module 1, as shown in FIG. 4, comprises a front-view digital camera, a first microprocessor, a rotation motor and a first interface 11 that are sequentially connected, the front-view digital camera and the first microprocessor are each connected with the first interface, and the output end of the first microprocessor is connected with the rotation motor; the crawler, as shown in FIG. 2, comprises a frame body 31, wheels 32 on the both sides of the frame body, a driving motor for driving the wheels 32, a sensor group for acquiring state parameters, a second microprocessor, a network transmission module, a first power carrier module, a second interface 33 matched with the first interface, and a power line interface 34 connected with the first power carrier module; the output end of the sensor group is connected with the second microprocessor, the output end of the second microprocessor is connected with the driving motor, and the second microprocessor is connected with the network transmission module; the network transmission module is connected with the first power carrier module, and the power line interface 34 inputs and outputs data through a power line; and the first microprocessor is connected with the second microprocessor through the first interface 11 and the second interface 33, and the front-view digital camera is connected with the network transmission module through the first interface 11 and the second interface 33.

A pipeline video signal acquisition and transmission device, comprising the pipeline robot, and also comprising a cable reel, wherein the cable reel comprises the power line connected with the power line interface, a second power carrier module for parsing power carrier signals into digital signals, a fourth microprocessor and a network communication module for performing data transmission with a monitoring system, and the second power carrier module, the fourth microprocessor and the network communication module are sequentially connected, as shown in FIG. 6. Preferably, the network communication module is a wireless communication module. The cable reel acquires power carrier signals from the power line, the power carrier signals are parsed by using the second power carrier module to obtain video signals, the video signals are sent to a remote terminal through a wired or wireless mode (such as wifi and 4G), control signals sent by the remote terminal are received by the cable reel through the wired or wireless mode, the cable reel utilizes the second power carrier module to transmit the control signals to the first power carrier module that is located on the crawler through the power line in the form of power carrier, and the first power carrier module parses out the control signals and then sends the signals to each microprocessor.

A pipeline detection system, comprising a pipeline robot, a cable reel and an acquisition control terminal, as shown in FIG. 5 and FIG. 6, the pipeline robot comprises a camera module 1 and a crawler 3, wherein the camera module 1, as shown in FIG. 4, comprises a front-view digital camera, a first microprocessor, a rotation motor and a first interface 11 that are sequentially connected, the front-view digital camera and the first microprocessor are each connected with the first interface, and the output end of the first microprocessor is connected with the rotation motor; the crawler, as shown in FIG. 2, comprises a frame body 31, wheels 32 on the both sides of the frame body, a driving motor for driving the wheels 32, a sensor group for acquiring state parameters, a second microprocessor, a network transmission module, a first power carrier module, a second interface 33 matched with the first interface, and a power line interface 34 connected with the first power carrier module; the output end of the sensor group is connected with the second microprocessor, the output end of the second microprocessor is connected with the driving motor, and the second microprocessor is connected with the network transmission module; the network transmission module is connected with the first power carrier module, and the power line interface 34 inputs and outputs data through a power line; and the first microprocessor is connected with the second microprocessor through the first interface 11 and the second interface 33, and the front-view digital camera is connected with the network transmission module through the first interface 11 and the second interface 33. The cable reel comprises the power line connected with the power line interface 34, a second power carrier module for parsing power carrier signals into digital signals, a fourth microprocessor and a network communication module for performing data transmission with a detection module, wherein the second power carrier module, the fourth microprocessor and the network communication module are sequentially connected. The acquisition control terminal is a mobile terminal provided with a detection module, which is used to receive digitalized video and state parameter signals from the network communication module, and the detection module receives the control instructions, the detection instructions and the input parameters through a human-computer interaction mode, sends the control instructions from the network communication module to the cable reel, performs corresponding operations according to the detection instructions, and carries out data storage.

Figure 1:
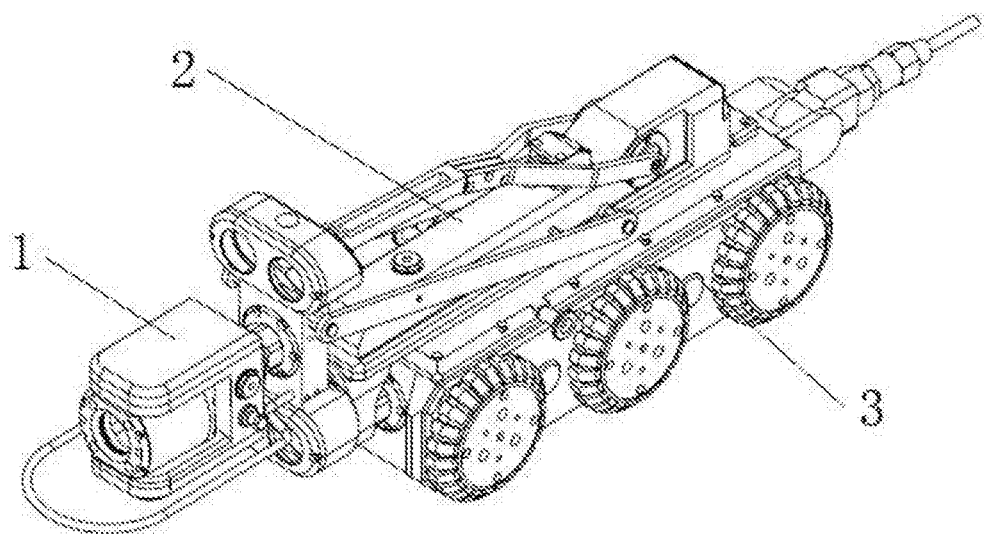
FIG. 1 is a structural schematic diagram of an embodiment of the invention.
Figure 3:
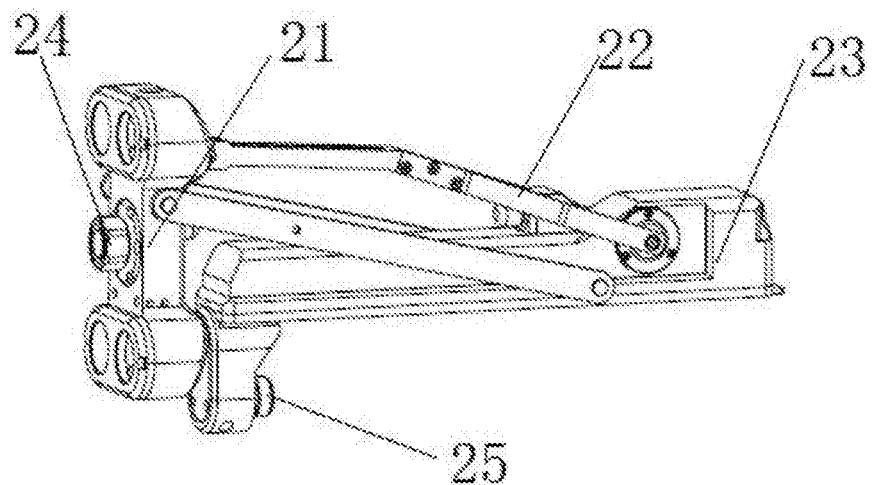
FIG. 3 is a structural schematic diagram of a lifting device.

Preferably, the pipeline robot also comprises a lifting device 2, as shown in FIG. 3 and FIG. 1, the lifting device 2 comprises a lifting frame body and a hardware module, wherein the lifting frame body is formed by sequentially connecting a lifting frame 21, a lifting aim 22 and a lifting seat 23 which is mechanically connected with the frame body 31 of the crawler 3; the hardware module comprises a third microprocessor and a lifting motor which are connected to each other, the lifting motor being used for driving the lifting arm 22; the lifting frame 21 is provided with a third interface 24 that is matched with the first interface 11, the lifting seat 23 is provided with a fourth interface 25 that is matched with the second interface 33, and the third microprocessor is connected between the first microprocessor and the second microprocessor through the first interface 11, the third interface 24, the fourth interface 25 and the second interface 33.

The role of the network transmission module is to converge signals from the first to third microprocessors and video signals from the camera into one path of signals, and thus the network transmission module can be connected with the first power carrier module. According to the embodiment, the network transmission module is a network switch.

Preferably, a plurality of sensors for acquiring state parameters can be separately arranged on the camera module and the crawler. For example, the camera module may also comprise an air pressure sensor connected with the first microprocessor, a light source for improving the video effect in the case of insufficient light, and the like; and a rear-view digital camera connected with the network transmission module is arranged on the lifting device, and the rear-view digital camera is provided with a light source that is connected with the second microprocessor, and so on.

The wheels can be understood as traditional wheels or crawler wheels, are only tools for the crawler to move forward and backward, and are not an innovation point, and the number of the wheels can also be set according to the length of the frame body and the size of the wheels. It should be understood that any structure that enables the crawler to move forward and backward and has the same function as the wheels shall fall into the protection scope of the invention.

In addition, in order to achieve better effects, the front-view digital camera can rotate horizontally and vertically, and thus the rotation motor may comprise a horizontal rotation motor and a vertical rotation motor; and in order to avoid excessive lifting of the lifting arm, the lifting arm is provided with a lifting limit position, and the lifting limit position is provided with a limit potentiometer that is connected with the third microprocessor.

According to the embodiment, the first to third microprocessors all select single-chip microcomputers; the first to fourth interfaces are waterproof aviation plugs; and the digital cameras are digital camera sensors with 2 million pixels or above, and have 10 times or above optical zoom functions and 12 times or above digital zoom functions.

According to the embodiment, sealing rings are arranged at all interfaces, blow holes are separately formed in all equipment (the camera module 1, the lifting device 2 and the crawler 3) to blow air into the equipment for pressurization, the air pressure is monitored through the air pressure sensor, and if the air pressure does not change after the equipment is placed for a period of time, it shows that good waterproof performance can be achieved. According to the embodiment, the waterproof levels of the camera module 1, the lifting device 2 and the crawler 3 are all IP68.

In specific applications, the camera module 1 can be directly connected with the crawler 3 through the first interface 11 and the second interface 33; and in some thicker pipelines, when the height of shooting videos is required, the camera module 1 is connected with the crawler 3 through the lifting device 2. The hardware module is built in the lifting device, the third interface 24 and the fourth interface 25 are also skillfully arranged to let the lifting device be electrically connected with the camera module 1 and the crawler 3 without the need of setting a connection line between the camera module 1 and the crawler 3 separately outside. Thus, tangled windings and other problems caused by the excessive lines during automatic crawling can be avoided, and meanwhile, the site assembly and disassembly can also be facilitated, the safety of the equipment can be protected to a great extent, and the service life of the equipment can be prolonged.

Preferably, the network communication module is the wireless communication module. The cable reel acquires power carrier signals from the power line, the power carrier signals are parsed by using the second power carrier module to obtain video signals, the video signals are sent to the mobile terminal through a wired or wireless mode (such as wifi and 4G), control signals sent by the mobile terminal are received by the cable reel through the wired or wireless mode, the cable reel utilizes the second power carrier module to transmit the control signals to the first power carrier module that is located on the crawler through the power line in the form of power carrier, and the first power carrier module parses out the control signals and then sends the signals to each microprocessor.

According to the embodiment, the cable reel also comprises a cable rack, an automatic line arrangement device, a driving part and a power supply system. The power line is a two-core coaxial cable or twisted pair or parallel line, the two-core power line synchronously transmits the power supplies, the video signals and the control signals, and thus the power line is thinner, lighter and firmer than a traditional 8-core cable line.

Figure 7:
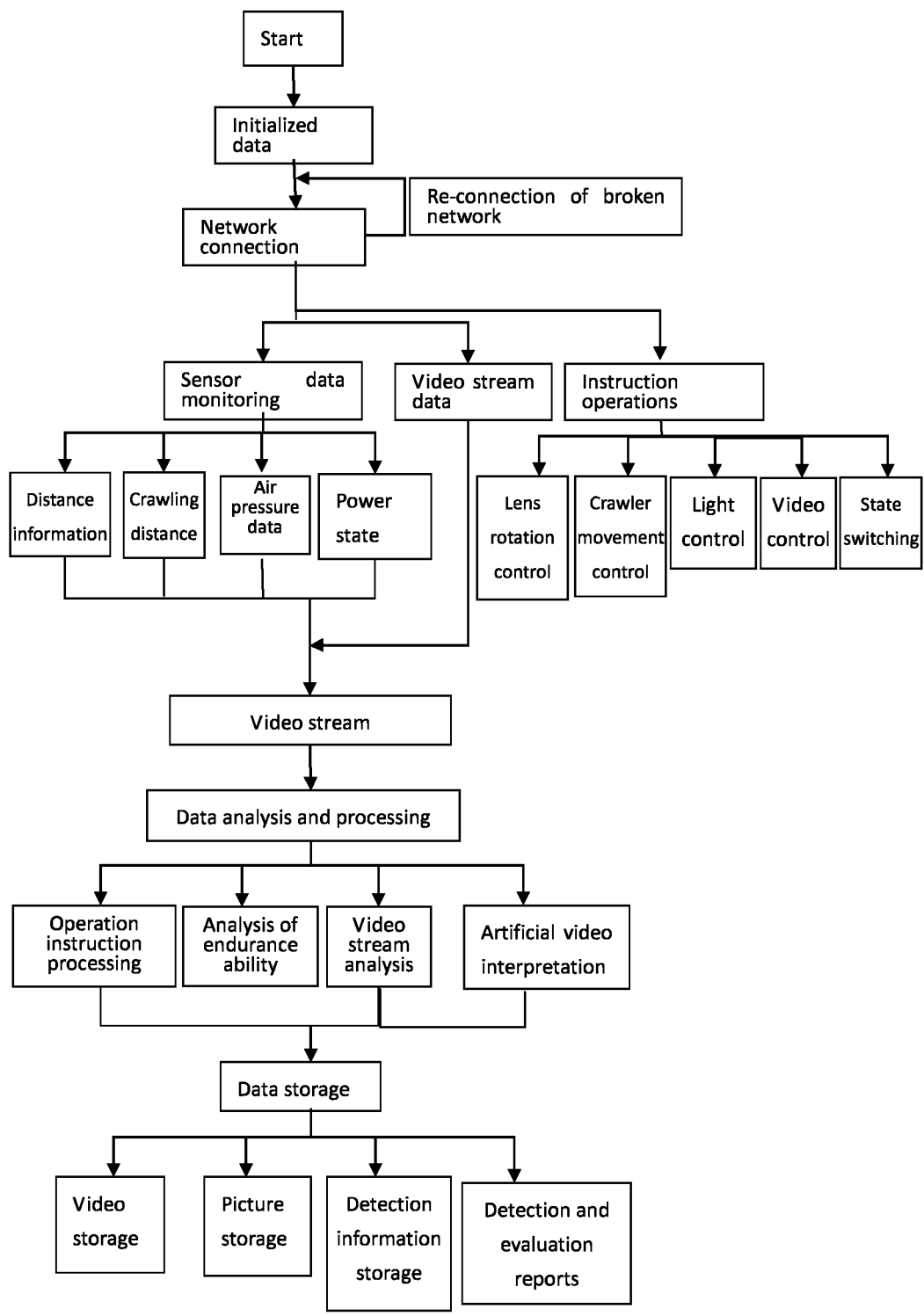
FIG. 7 is a flowchart of an operation method of an embodiment of the invention.

A detection method implemented by using the pipeline detection system, as shown in FIG. 7, comprising the following steps:

S1, the mobile terminal with the detection module carries out a network connection with the cable reel;

S2, video data acquired by the front-view digital camera in the pipeline robot and data acquired by the sensor group are combined into one path of digital signals through the network transmission module, and the digital signals are transmitted to the second power carrier module on the cable reel through the power line by the first power carrier module in the form of power carrier; the second power carrier module on the cable reel parses out the digital signals and sends the digital signals to the mobile terminal that is provided with the detection module through the network communication module; and the detection module superposes the data acquired by the sensor group to the video data acquired by the front-view digital camera for display; and S3, the detection module receives the control instructions, the detection instructions and the input parameters through a human-computer interaction mode;

the control instructions are sent to the cable reel through the network communication module, and then are transmitted to the pipeline robot through the power line by the second power carrier module in the form of power carrier to call each corresponding microprocessor to perform instruction operations;

the detection module further comprises a calculation module for performing calculation by using the input parameters according to a pipeline detection standard and generating a detection report; and the detection module performs corresponding operations according to the detection instructions and carries out data storage.

Further detailed, the control instructions include a rotation motor control instruction, a driving motor control instruction, a digital camera control instruction and a light source switch instruction; and the detection instructions include a picture storage instruction, a video storage instruction, a detection report generation instruction and a detection report storage instruction.

According to the embodiment, the front-view digital camera and the rear-view digital camera are digital high-definition cameras, the acquisition of high-definition digital video signals can be achieved, carrier signals are acquired and transmitted through the first power carrier module arranged in the crawler, the synchronous and common-line transmission of the power supplies, the video signals and the control signals to the cable reel can be achieved, the carrier signals are received and parsed through the second power carrier module of the cable reel, the digital signals are transmitted by the wireless transmission module of the cable reel, the signals are received by computers or tablets and other mobile terminals with wireless transmission functions to realize the recording and storage of the signals, and the informationalized preservation and management of pipeline detection information based on a GIS platform can be achieved in combination with a geographic information system through GIS information.

According to the above, the input parameters are pipeline properties and the like, can be input through the human-computer interaction mode, and can also be directly acquired from the geographic information system, the calculation module pedal us calculation by using the input parameters according to the pipeline detection standard and generates the detection report, and the pipeline detection standard is an industry standard known to those skilled in the art and also has an open formula, only by setting the formula in the calculation module, a detection result can be calculated in the calculation module by using detected data and the input parameters, and then the detection report is generated according to the detection instructions, and the detection report can be stored and uploaded to other platforms such as the geographic information system by using wireless networks for storage and presentation.

The mobile terminal can also realize signal transmission with the cable reel in the form of a wired network line.

The technology has the advantages that the ultra-long-distance transmission (more than 3 km) of the signals can be achieved, and the synchronous and common-line transmission of the power supplies, the video signals and the control signals can be achieved by merely using the two-core cable.

According to the embodiment, the camera module is provided with the front-view digital camera, the light source, the horizontal rotation motor, the vertical rotation motor, the air pressure sensor and the limit potentiometer. The front-view digital camera is the digital camera sensor with 2 million pixels or above. The front-view digital camera can achieve horizontal 360-degree infinite rotation and vertical 270-degree rotation, and can be centered and reset by one key. The camera module can also be equipped with a parallel laser measurement system to effectively survey and map crack widths. The front-view digital camera has a 10 times or above optical zoom function and a 12 times or above digital zoom function. The camera module can also be provided with the air pressure sensor and an air pressure indicator lamp which can indicate the size of the air pressure in different colors, and can also transmit air pressure values and display the values in video images of an acquisition terminal.

An angle sensor is arranged on the rotation motor to acquire rotation angles of the front-view digital camera, and the rotation angles can also be displayed in the video images of the mobile terminal in a digital form; and the brightness of the light source arranged on the camera module can be adjusted steplessly.

The crawler consists of a driving mechanical part, a network transmission module, a carrier transmission module, a motor driving module, a clutch and the like. The air pressure sensor can be arranged on the lifting device to acquire the air pressure, and through the indication of the air pressure indicator lamp, the air pressure values can be transmitted to the mobile terminal and displayed in the video images in an overlapping mode; and a rear-view light source and the rear-view digital camera can also be arranged at the tail of the lifting device and can be separately connected with the second microprocessor and the network transmission module in the crawler through the interfaces. The rear-view digital camera is the digital camera sensor with 2 million pixels or above, and the brightness of the rear-view light source can be adjusted steplessly.

The driving motor of the crawler has a function of an electronic clutch, in the case of power down, the clutch is released, and the crawler can be easily pushed.

The lifting device is of a parallel 'Y' type bracket structure, and an air spring assists the lifting.

The video signals, the sensor data signals and the control signals are all transmitted and stored in the form of digital signals and are transmitted between the cable reel and the pipeline robot in the form of power carriers.

The power supply for the entire system is a main supply, and can also be a direct current battery system.

The detection module is an application software system installed in the computers or the tablets with the wireless transmission functions, and application software can run on various system platforms such as WINDOWS, iOS and ANDROID. The computers or the tablets equipped with the application software are in wireless connection with the cable reel through the wireless networks, a wired network interface is reserved on the cable reel, and thus the cable reel can be connected with the acquisition control system through a universal network cable. According to the control instructions, the detection module controls the cable reel to wind and unwind the power line, controls the crawler to move forward and backward and rotate left and right, controls the lifting device to lift up and down, controls the brightness of the light sources to be adjusted steplessly, controls the switching between the front-view digital camera and the rear-view camera, can simultaneously and synchronously display and acquire front and rear videos, and controls a front-view camera probe to perform focusing, zooming, rotation and light adjustment, perform laser measurement on the crack widths, acquire the air pressure, and acquire a crawling distance value through an encoder; the computers or the tablets acquire geographic coordinate information of the GIS through the own GIS module; the videos are displayed and acquired on an application software interface, and distance information, project information, time, dates, electricity quantity and working time information, and the GIS information are superimposed on the videos; and the results are embedded into the geographic information system platform through GIS positioning information.

By combining a digital photography technology and a wireless transmission technology, the system makes the digitization of the pipeline wireless robot detection system come true, digitization results can be acquired through the terminals with the wireless transmission functions on site, and site acquisition results can be directly transmitted to a geographic information system server platform in the background for backup and management in a digital form through 5G or other network transmission systems.

The above embodiments are only used to illustrate the design ideas and characteristics of the invention, the purpose is to enable those skilled in the art to understand the contents of the invention and implement the contents accordingly, and the protection scope of the invention is not limited to the above embodiments. Therefore, all equivalent changes or modifications made in accordance with the principles and design ideas disclosed by the invention shall fall into the protection scope of the invention.

What is claimed is:

1. A pipeline robot, comprising a camera module and a crawler,
the camera module comprises a front-view digital camera, a first microprocessor, a rotation motor and a first interface, wherein the front-view digital camera and the first microprocessor are each connected with the first interface, and the output end of the first microprocessor is connected with the rotation motor;
the crawler comprises a frame body, wheels on the both sides of the frame body, a driving motor for driving the wheels, a sensor group for acquiring state parameters, a second microprocessor, a network switch, a first power carrier module, a second interface matched with the first interface, and a power line interface connected with the first power carrier module, wherein the output end of the sensor group is connected with the second microprocessor, the output end of the second microprocessor is connected with the driving motor, and the second microprocessor is connected with the network switch; and the network switch is connected with the first power carrier module, and the power line interface inputs and outputs data through a power line; and
the first microprocessor is connected with the second microprocessor through the first interface and the second interface, and the front-view digital camera is connected with the network switch through the first interface and the second interface.

2. The pipeline robot according to claim 1, wherein the pipeline robot also comprises a lifting device, the lifting device comprises a lifting frame body and a hardware module; the lifting frame body is formed by sequentially connecting a lifting frame, a lifting arm and a lifting seat, and the lifting seat is mechanically connected with the frame body of the crawler; the hardware module comprises a third microprocessor and a lifting motor which are connected to each other, the lifting motor being used for driving the lifting arm; the lifting frame is provided with a third interface that is matched with the first interface, the lifting seat is provided with a fourth interface that is matched with the second interface, and the third microprocessor is connected between the first microprocessor and the second microprocessor through the first interface, the third interface, the fourth interface and the second interface.

3. The pipeline robot according to claim 1, wherein the camera module also comprises an air pressure sensor connected to the first microprocessor.

4. The pipeline robot according to claim 1, wherein the rotation motor comprises a horizontal rotation motor and a vertical rotation motor.

5. The pipeline robot according to claim 2, wherein the lifting arm is provided with a lifting limit position, and the lifting limit position is provided with a limit potentiometer connected to the third microprocessor.

6. The pipeline robot according to claim 1, wherein the crawler is provided with a rear-view camera that is connected with the network switch through the fourth interface and the second interface.

7. The pipeline robot according to claim 1, wherein the camera module is provided with a light source that is connected with the second microprocessor through the first interface and the second interface.

8. A pipeline video signal acquisition and transmission device, comprising the pipeline robot according to claim 1, and also comprising a cable reel, wherein the cable reel comprises a power line connected with a power line interface, a second power carrier module for parsing power carrier signals into digital signals, a fourth microprocessor and a network communication module for performing data transmission with a monitoring system, wherein the second power carrier module, the fourth microprocessor and the network communication module are sequentially connected.

9. The pipeline video signal acquisition and transmission device according to claim 8, wherein the network communication module is a wireless communication module.

10. A pipeline detection system, comprising a pipeline robot, a cable reel and an acquisition control terminal, the pipeline robot comprises a camera module and a crawler;
the camera module comprises a front-view digital camera, a first microprocessor, a rotation motor and a first interface, wherein the front-view digital camera and the first microprocessor are each connected with the first interface, and the output end of the first microprocessor is connected with the rotation motor;

the crawler comprises a frame body, wheels on the both sides of the frame body, a driving motor for driving the wheels, a sensor group for acquiring state parameters, a second microprocessor, a network switch, a first power carrier module, a second interface matched with the first interface, and a power line interface connected with the first power carrier module, wherein the output end of the sensor group is connected with the second microprocessor, the output end of the second microprocessor is connected with the driving motor, and the second microprocessor is connected with the network switch; and the network switch is connected with the first power carrier module, and the power line interface inputs and outputs data through a power line;

the first microprocessor is connected with the second microprocessor through the first interface and the second interface, and the front-view digital camera is connected with the network switch through the first interface and the second interface;

the cable reel comprises the power line connected with the power line interface, a second power carrier module for parsing power carrier signals into digital signals, a fourth microprocessor and a network communication module for performing data transmission with a detection module, wherein the second power carrier module, the fourth microprocessor and the network communication module are sequentially connected, wherein the detection module comprises a calculation module, a data storage and an application software; and the acquisition control terminal is a mobile terminal provided with the detection module, which is used to receive digitalized video and state parameter signals from the network communication module, and the detection module receives control instructions, detection instructions and input parameters through a human-computer interaction mode, sends the control instructions from the network communication module to the cable reel, performs corresponding operations according to the detection instructions, and carries out data storage.

11. The pipeline detection system according to claim 10, wherein the pipeline robot also comprises a lifting device, the lifting device comprises a lifting frame body and a hardware module; the lifting frame body is formed by sequentially connecting a lifting frame, a lifting arm and a lifting seat, and the lifting seat is mechanically connected with the frame body of the crawler; the hardware module comprises a third microprocessor and a lifting motor which are connected to each other, the lifting motor being used for driving the lifting arm; the lifting frame is provided with a third interface that is matched with the first interface, the lifting seat is provided with a fourth interface that is matched with the second interface, and the third microprocessor is connected between the first microprocessor and the second microprocessor through the first interface, the third interface, the fourth interface and the second interface.

12. The pipeline detection system according to claim 10, wherein the camera module also comprises an air pressure sensor connected to the first microprocessor.

13. The pipeline detection system according to claim 10, wherein the rotation motor comprises a horizontal rotation motor and a vertical rotation motor.

14. The pipeline detection system according to claim 11, wherein the lifting arm is provided with a lifting limit position, and the lifting limit position is provided with a limit potentiometer connected to the third microprocessor.

15. The pipeline detection system according to claim 11, wherein the lifting frame is provided with a rear-view digital camera that is connected with the network switch through the fourth interface and the second interface.

16. The pipeline detection system according to claim 10, wherein the camera module is provided with a light source that is connected with the second microprocessor through the first interface and the second interface.

17. A detection method implemented by using the pipeline detection system according to claim 10, comprising the following steps:
S1, the mobile terminal with the detection module carries out a network connection with the cable reel;
S2, video data acquired by the digital camera in the pipeline robot and data acquired by the sensor group are combined into one path of digital signals through the network switch, and the digital signals are transmitted to the second power carrier module on the cable reel through the power line by the first power carrier module in the form of power carrier; the second power carrier module on the cable reel parses out the digital signals and sends the digital signals to the mobile terminal that is provided with the detection module through the network communication module; and the detection module superposes the data acquired by the sensor group to the video data acquired by the digital camera for display; and
S3, the detection module receives the control instructions, the detection instructions and the input parameters through a human-computer interaction mode;
the control instructions are sent to the cable reel through the network communication module, and then are transmitted to the pipeline robot through the power line by the second power carrier module in the form of power carrier to call each corresponding microprocessor to perform instruction operations;
the detection module further comprises a calculation module for performing calculation by using the input parameters according to a pipeline detection standard and generating a detection report; and
the detection module performs corresponding operations according to the detection instructions and carries out data storage.

18. The detection method according to claim 17, wherein the control instructions include a rotation motor control instruction, a driving motor control instruction, a digital camera control instruction and a light source switch instruction.

19. The detection method according to claim 17, wherein the detection instructions include a picture storage instruction, a video storage instruction, a detection report generation instruction and a detection report storage instruction.

20. A pipeline video signal acquisition and transmission device, comprising the pipeline robot according to claim 2, and also comprising a cable reel, wherein the cable reel comprises a power line connected with a power line interface, a second power carrier module for parsing power carrier signals into digital signals, a fourth microprocessor and a network communication module for performing data transmission with a monitoring system, wherein the second power carrier module, the fourth microprocessor and the network communication module are sequentially connected.

* * * * *